United States Patent
Derichs

[11] Patent Number: 5,887,417
[45] Date of Patent: Mar. 30, 1999

[54] OPEN-END SPINNING APPARATUS WITH A SPINNING ROTOR DRIVEN BY A SINGLE MOTOR

[75] Inventor: Josef Derichs, Mönchengladbach, Germany

[73] Assignee: W. Schlafhorst AG & Co., Moenchengladbach, Germany

[21] Appl. No.: 949,467

[22] Filed: Oct. 14, 1997

[30] Foreign Application Priority Data

Oct. 15, 1996 [DE] Germany ............... 196 42 471.2

[51] Int. Cl.⁶ ............................................. D01H 4/00
[52] U.S. Cl. ............................. 57/406; 57/404; 57/407
[58] Field of Search ............................. 57/404, 406, 407

[56] References Cited

U.S. PATENT DOCUMENTS

| | | | |
|---|---|---|---|
| 3,875,732 | 4/1975 | Ellingham | 57/406 |
| 4,306,166 | 12/1981 | Quandt | 57/406 |
| 4,519,205 | 5/1985 | Gubler | 57/406 |
| 4,543,780 | 10/1985 | Muller et al. | 57/406 |
| 4,633,664 | 1/1987 | Mueller-Storz et al. | 57/406 |
| 5,450,718 | 9/1995 | Knabel et al. | 57/404 |
| 5,622,040 | 4/1997 | Preutenborbeck et al. | 57/406 |

FOREIGN PATENT DOCUMENTS

| | | |
|---|---|---|
| 74 203 | 6/1970 | Germany . |
| 20 63 794 | 7/1972 | Germany . |
| 2 203 586 | 8/1973 | Germany . |
| 60 224 823 | 4/1984 | Germany . |
| 33 46 843 A1 | 7/1985 | Germany . |
| 34 01 315 A1 | 7/1985 | Germany . |
| 34 17 705 A1 | 11/1985 | Germany . |
| 37 34 545 A1 | 5/1989 | Germany . |
| 40 22 562 A1 | 1/1992 | Germany . |

*Primary Examiner*—William Stryjewski
*Attorney, Agent, or Firm*—Kennedy Covington Lobdell & Hickman, LLP

[57] ABSTRACT

An OE spinning apparatus 1 with a spinning rotor 2 having a hollow shaft 26 supported radially in a wedge-like gap 25 of a support-disk bearing 4 and driven by an individual motor 9 comprising an armature 11 integrated into hollow shaft 26 at its end and a stator 10 fixed to spinning-box housing 12. Pressure roller 8 rotates about axis 24 angled acutely to rotor shaft 3 to urge rotor shaft 3 into the gap 25 and also in the direction of axial bearing 13, which may be a permanent magnet bearing or pneumatic bearing. Spinning apparatus 1 thereby has a high natural frequency, which makes possible very high rotor speeds.

9 Claims, 3 Drawing Sheets

OPEN-END SPINNING APPARATUS WITH A SPINNING ROTOR DRIVEN BY A SINGLE MOTOR

BACKGROUND OF THE INVENTION

The present invention relates to open-end spinning apparatus and, more particularly, to an open-end spinning apparatus with a spinning rotor having a rotor shaft supported in a wedge-like gap, or spandrel, between two spaced pair of support rollers and driven by an individual drive motor.

It is especially important in the continuing development of open-end spinning machines that, in addition to improving the quality of the yarns produced, the production output of such textile machines is increased. The speed of the spinning rotor is primarily determinative of the production output of open-end rotor spinning machines. For this reason, various drive and bearing variants have been developed for spinning rotors over the course of past years which make it possible to achieve rotor speeds above 100,000 rpms.

In the embodiment most frequently used in practice, two pairs of disk-like support rollers are provided in spaced relation about adjacent rotational axes for supporting the axial shaft of the spinning rotor in the wedge-like gap, or spandrel, defined by the rollers, with the rotor shaft being driven by a tangential belt which biases the shaft into the gap. The axes of the support disk pairs are slightly out of parallel to intersect one another at an acute angle, so that a force component directed on the end of the rotor shaft is produced. The necessary axial support of the rotor shaft takes place in these known rotor spinning devices preferably via a mechanical axial bearing or via a magnet bearing, as is shown by way of example in German Patent Publication DE 40 22 562 A1.

Another spinning apparatus which has a comparable support arrangement for the rotor shaft is described in German Patent Publication DE 37 34 545 A1. This publication discloses, among other things, a variant in which the individual spinning rotors are not driven by a common tangential belt running the length of the machine but rather are driven by individual drives. In this case, the rotor shafts of the individual spinning rotors are each biased into the support roller gap by a drive roller engaging the rotor shaft in opposition to the support rollers and driven by an electromotor. Although the publication explains that rotor speeds of greater than 150,000 rpms can be achieved with such a device, this known device has not been accepted in practice.

Single-motor drives for spinning rotors are also known from Japanese Patent Publication JP-A 60-224823 and German Patent Publication DE-OS 22 03 586.

Japanese Patent Publication JP-A 60-224823 discloses a spinning rotor supported with its rotor shaft supported in a bearing formed of support-disk pairs with an electric drive operating on the rotor shaft in the area between the support disks. Specifically, a rotor armature fixed externally to the rotor shaft rotates in a stator fixed to the support body of the support-disk bearing or to the spinning-box housing.

German Patent Publication DE-OS 22 03 586 describes a similar device wherein the individual electric drive is also formed by a rotor armature fixed externally to the rotor shaft and by a stationary stator arranged on the spinning-box housing. The drive can be arranged either on the end of the rotor shaft or as in Japanese Patent Publication JP-A 60-224823 in the area between the support disks.

These devices have the particular disadvantage that it is not possible to exchange the spinning components without expensive mounting work on the spinning unit since spinning rotors designed in this manner can not be readily removed to the front out of the rotor housing as is customary in other known open-end spinning machines, e.g., those machines having spinning rotors driven via tangential belts.

SUMMARY OF THE INVENTION

In view of the foregoing state of the art, a basic object of the present invention is to provide an improved means of driving the spinning rotors in an open-end spinning apparatus via individual respective drive motors, particularly in such machines wherein the rotors are supported by bearing formed by pairs of support rollers.

The present invention achieves this objective by providing an open-end spinning apparatus comprising a spinning rotor, a hollow rotor shaft fixed coaxially to the rotor, a support-disk bearing having two pairs of support rollers defining a wedge-like gap in which the rotor shaft is radially supported, an axial bearing acting axially on the rotor shaft, and an individual electromotor drive for driving the rotor shaft, with the individual electromotor drive being integrated with the hollow rotor shaft.

Individual electromotor drives in conjunction with open-end rotor spinning devices have the chief advantage of avoiding the conventional limitation of speed imposed by the design of the drive arrangement, such as in the case of spinning devices driven by tangential belts because of the maximum possible belt speed. Thus, clear increases of the rotor speeds over the current spinning devices can be realized.

The hollow rotor shaft has a diameter relatively substantially enlarged in comparison to the rotor shafts heretofore customary, which results in an extremely rigid rotor shaft. This increased rigidity of the rotor shaft can be positively noticed by a higher natural frequency of the spinning unit, so that the critical speed range of such an open-end spinning apparatus is significantly above the speed ranges of conventional open-end spinning devices which were previously recognized as critical.

The integration of the rotor armature of each respective individual electromotor drive into the hollow rotor shaft also has an advantageous effect on the handling of the spinning apparatus since the spinning rotor, as is the case with spinning units loaded by a tangential belt, remains readily exchangeable. Thus, in a batch replacement operation, wherein particular spinning units may also be changed, or if a spinning rotor must be exchanged on account of wear, it is easy to withdraw the spinning rotor frontally out of the rotor housing. Correspondingly, there are no problems when installing the spinning rotor of the present invention since the rotor shaft can be readily inserted from the front of the rotor housing into the support-disk bearing. No tools or expensive mounting actions are necessary for this operation.

It is especially advantageous if the rotor armature of the individual electromotor drives is integrated into the end area of the hollow rotor shaft so that, when installed, such drive end of the rotor shaft is located inwardly behind the support-disk bearing where the necessary space exists within the housing for arranging the associated stator.

A chamfering in the end area of the rotor shaft has advantages in facilitating the installation of the spinning apparatus into the support-disk bearing, particularly during the insertion of the armature-carrying end of the rotor shaft into the stator of the individual electromotor drive located behind the support-disk bearing.

It is also preferable if the circumferential periphery of a biasing roller or disk located between the support disk pairs to act in opposition thereto on the rotor shaft is formed with a corresponding chamfering. As has already been indicated above, such chamferings considerably facilitate the insertion of the rotor shaft into the support-disk bearing.

The biasing roller or disk acting on the rotor shaft between the axially spaced support disks of the support-disk pairs is loaded on the one hand by a spring element, e.g., a tension spring, and on the other hand by a damping device. The damping device assures that the pressure roller rests during the spinning operation very largely free of oscillations by the rotor shaft while rotating in the spandrel of the support-disk bearing.

Moreover, it is additionally preferable to provide an adjustable stop in the area of a bearing arm by which the biasing disk is supported to limit the downward spring deflection of the bearing arm when the spinning rotor is withdrawn, whereby the biasing roller or disk does not interfere or otherwise cause problems during the reinstallation of the rotor shaft of the spinning apparatus into the support-disk bearing.

It is further preferred that the axis of the biasing disk be oriented at a slightly acute angle with respect to the axis of the rotor shaft to assure that the rotor shaft is always urged endwise into its axial end bearing, which is necessary for an uninterrupted spinning process. This feature also makes it possible advantageously to arrange the support-disk pairs with their bearing axes in parallel relation to one another, which has a positive effect in reducing the wear of their peripheral races which constantly run in engagement with the rotor shaft.

The axial end bearing for the rotor shaft can be selected to be a permanent-magnet bearing or a pneumatic bearing or even a combination thereof. Such bearings have the principal advantage that they operate essentially without wear. In addition, a permanent magnet bearing has the advantage that such bearings require no additional energy during the spinning process for maintaining the bearing operation.

According to a further feature of the invention, the spacing between the pairs of support rollers is approximately one-third to one-half of the total length of the rotor shaft. Such a shortening of the axial spacing between the roller pairs of the support-disk bearing can further increase the natural frequency of the spinning apparatus, which can promote further increases in rotor speeds and therewith further increases in the productivity of the open-end rotor spinning machines.

Further details and features of the present invention will be appreciated and understood from the exemplary embodiments described hereinbelow and with reference to the accompanying drawings.

DESCRIPTION OF THE PREFERRED EMBODIMENTS

Figure 1:
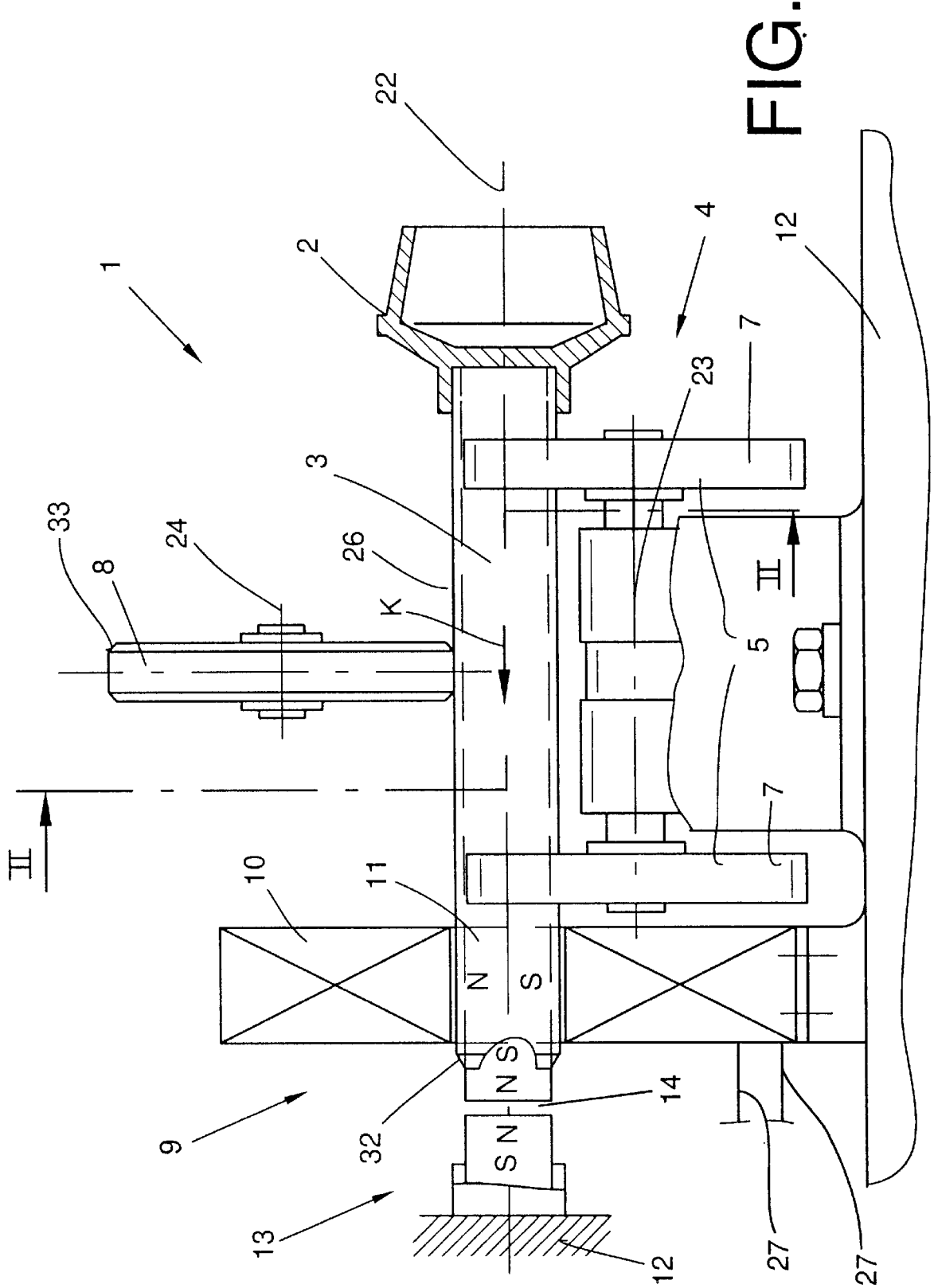
FIG. 1 is a side elevational view of a first embodiment of the open-end spinning apparatus in accordance with the present invention.

Referring now to the accompanying drawings and initially to FIG. 1, the spinning components of a rotor spinning apparatus 1 are shown and basically comprise a spinning rotor consisting as usual of a rotor cup 2, a rotor shaft 3 fixed axially to the rotor cup 2, a support-disk bearing 4 in which the rotor shaft 3 is supported radially, a biasing roller 8 acting in opposition to the support-disk bearing 4, an axial bearing 13 supporting the rotor shaft in the axial direction, and an individual electromotor drive 9 acting on the axial end of the rotor shaft 3 opposite the rotor cup 2.

The support-disk bearing 4 comprises two pairs 5,6 of axially spaced support rollers or disks 7, the respective rollers 7 of each pair being arranged on a common rotational axis and with the axes of the two pairs arranged in sufficiently close adjacency that the rollers of the respective pairs overlap one another to define therebetween a wedge-like gap or spandrel 25 in which the rotor shaft rests. The biasing roller 8 is positioned approximately centrally between the two pair of support disks 7, with the axis 24 of the biasing roller 8 arranged at a slight acute angle relative to the axis 22 of rotor shaft 3. Biasing roller 8 rests on and serves to urge the rotor shaft 3 securely into the wedge-like gap 25 of the support-disk bearing 4 and, due to the acutely angled orientation of the biasing roller 8 relative to the rotor shaft 3, also urges the rotor shaft 3 in an axial direction into operative relationship with the axial bearing 13 at the end of the rotor shaft 3.

The rotor shaft 3 is preferably hollow, as indicated at 26, and is driven at its end by the individual electromotor drive 9. The individual electromotor drive 9 consists of a stator 10, which is fixed on the spinning-box housing 12 and is supplied with operating electrical current via leads 27, and a rotor armature 11 integrated into the hollow area 26 of the rotor shaft 3 of the spinning apparatus 1. The armature 11 may be mounted permanently into rotor shaft 3 or can be fixed so as to be exchangeable.

The axial support of rotor shaft 3 of rotor spinning apparatus 1 takes place as is customary via the axial bearing 13 which can be designed, e.g., as is indicated in FIG. 1, as a permanent magnet bearing 14. The particular design and mode of operation of such permanent magnet bearings 14 is known and described in some detail, e.g., in German Patent Publication DE 40 22 562 A1.

In an alternative embodiment, the acutely angled orientation of the axes of the roller pairs of the support-disk bearing 4 or of the axis of biasing roller 8 relative to the rotor shaft 3 can even be entirely eliminated and, instead, the rotor shaft 3 on the support-disk bearing can be fixed purely magnetically. Such a bearing is described e.g. in German Patent Publication DE 195 42 079 A1. In this instance the rotor shaft 3 comprises an externally located magnet ring which is loaded in an axial direction by appropriately poled, stationary magnet rings positioned in front of and behind it.

Figure 3:
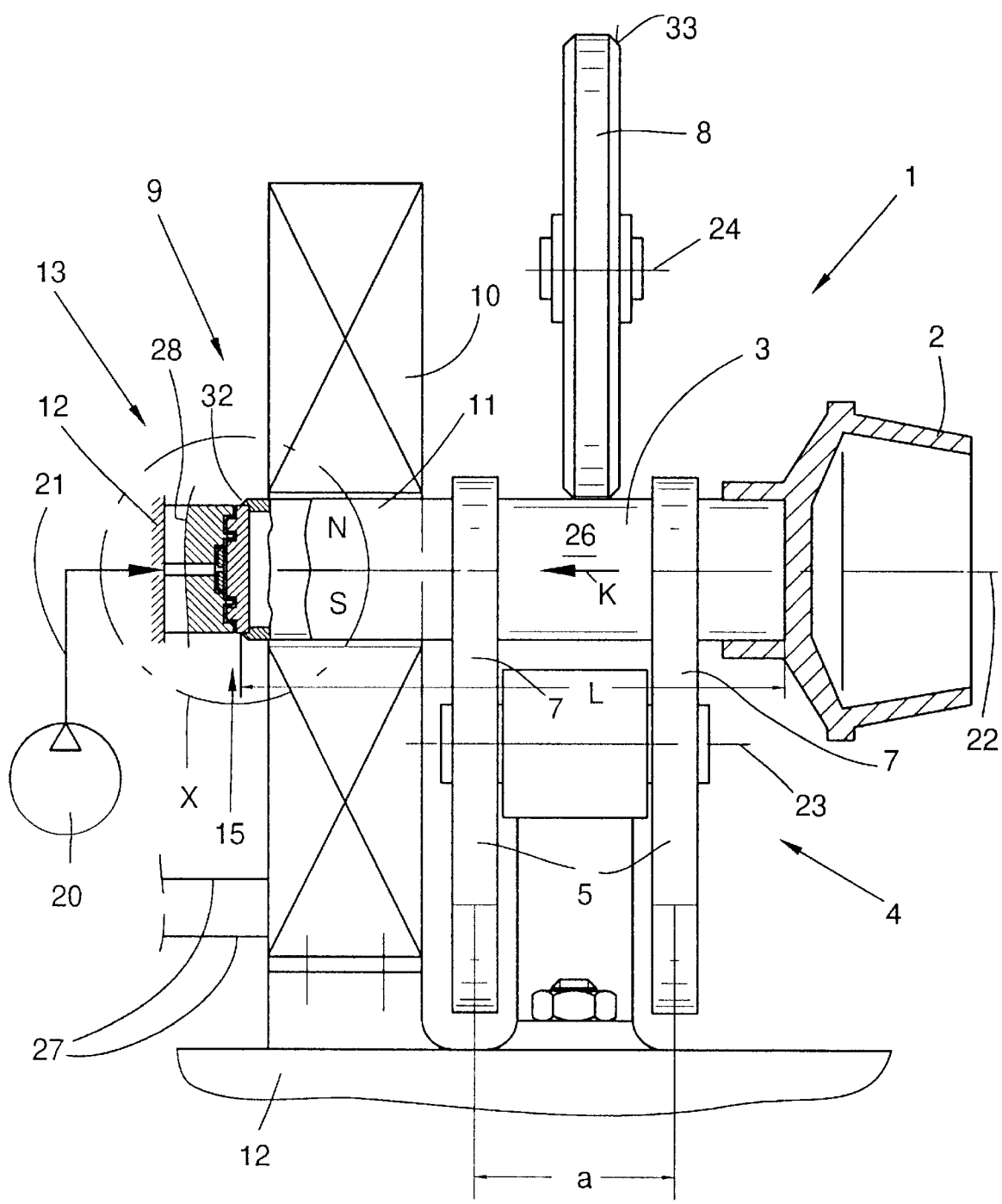
FIG. 3 is a side elevational view of a further advantageous embodiment of the spinning apparatus in accordance with the present invention.

Instead of the permanent magnet bearing 14 previously described in FIG. 1, a pneumatic bearing 15 can also be provided as the axial bearing 13, as is indicated in FIG. 3. Such pneumatic bearings 15 are known in principle in connection with rotor spinning devices. For example, German Patent Publication DE-OS 24 33 712 describes a shaftless spinning rotor which is held in the radial direction via an electromagnetic bearing and whose axial bearing is designed as a pneumatic bearing.

Figure 4:
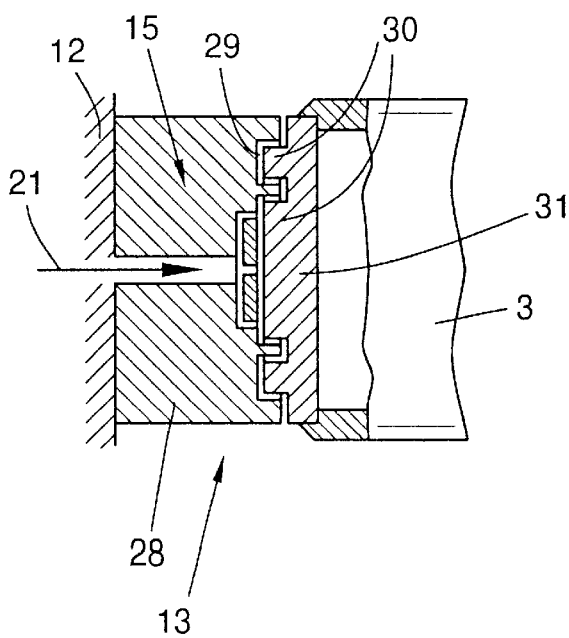
FIG. 4 is an enlarged detailed view of the area X shown in FIG. 3.

As is indicated in FIG. 3 and presented on a larger scale in FIG. 4, such pneumatic bearings 15 consist essentially of a bearing body 28 with pneumatic bearing grooves 29 connected via a pneumatic line 21 to a source of compressed air 20. The pneumatic bearing grooves 29 are preferably designed as a labyrinth and correspond to compatibly formed bearing shoulders 30 of a bearing element 31 fastened on one end to rotor shaft 3.

Figure 2:
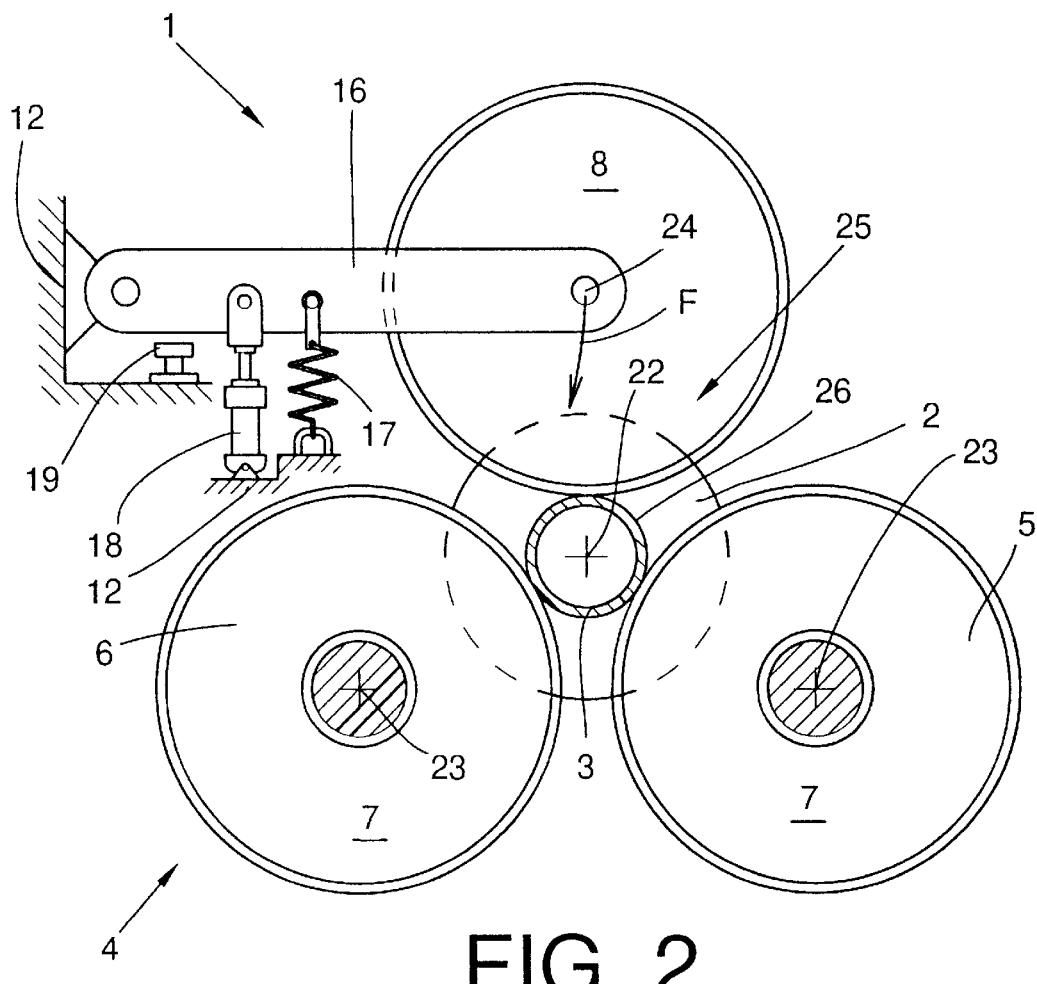
FIG. 2 is a cross-sectional view of the spinning apparatus of FIG. 1 taken along section II—II.

As already indicated, the rotor shaft 3 of rotor spinning apparatus 1 is held during operation by the pressure roller 8 in the wedge-like gap 25 defined by the support-disk bearing 4. As shown in FIG. 2, the biasing roller 8 is urged in the radial direction toward the rotor shaft 3, indicated by arrow F, by a spring element 17 acting on a pivotable bearing arm 16 which supports the biasing roller 8. In addition, a damping device 18 is mounted to the bearing arm 16. The spring deflection F of the bearing arm 16 is limited via a stop element 19, which is preferably adjustable, to assure that sufficient space always remains open in the area of the gap 25 that the rotor shaft 3 of a spinning apparatus 1 can be readily inserted.

The axis 24 of the biasing roller 8 is slightly angled acutely relative i:o the central axis 22 of rotor shaft 3 so that during the operation of the spinning device a force component K (FIG. 1) is directed toward the end of the rotor shaft to hold the rotor shaft 3 in operative disposition with respect to the axial bearing 13.

The embodiment of FIG. 3 differs from that of FIG. 1 primarily by a substantially reduced axial spacing a between the support disks 7, which has a positive action on the oscillatory behavior of the apparatus, that is, the natural frequency of rotor spinning apparatus 1 is further increased, which can facilitate and promote a further increases in the spinning rotor speeds and therewith production increases of the textile machine.

The present invention is not limited to the exemplary embodiments shown, especially not to the form and arrangement of the axial bearing. For example, the axial bearing could also be arranged in the area of the spinning cup 2 without departing from the actual inventive concept of a rotor shaft as a hollow shaft with a motor drive armature integrated into the hollow shaft.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. An open-end spinning apparatus comprising a spinning rotor, a hollow rotor shaft fixed coaxially to the rotor, a support-disk bearing having two pairs of support rollers defining a wedge-like gap in which the rotor shaft is radially supported, an axial bearing acting axially on the rotor shaft, and an individual electromotor drive for driving the rotor shaft, the individual electromotor drive including an armature integrated into the hollow rotor shaft, wherein the spinning rotor and the rotor shaft are readily removed out of and installed into the support disk bearing.

2. The open-end spinning apparatus according to claim 1, wherein the armature of the individual electromotor drive is fixed in an end area of the hollow rotor shaft.

3. The open-end spinning apparatus according to claim 2, wherein the end area of the hollow rotor shaft is chamfered.

4. The open-end spinning apparatus according to claim 1, and further comprising a peripherally chamfered biasing roller arranged between the support rollers of the support disk bearing for urging the rotor shaft into the wedge-like gap of the support-disk bearing.

5. The open-end spinning apparatus according to claim 4, and further comprising a movable arm supporting the biasing roller and a biasing spring element and a damping device acting upon the movable arm.

6. The open-end spinning apparatus according to claim 5, and further comprising a stop for limiting movement of the arm toward the support disk bearing.

7. The open-end spinning apparatus according to claim 1, wherein the axial bearing comprises a pneumatic bearing.

8. The open-end spinning apparatus according to claim 1, wherein the axial bearing comprises a permanent magnet bearing.

9. The open-end spinning apparatus according to claim 1, wherein the support rollers are spaced axially from one another at a distance approximately ⅓ to ½ of the total length of the rotor shaft.

* * * * *